United States Patent
Boukadakis

(10) Patent No.: US 10,255,914 B2
(45) Date of Patent: Apr. 9, 2019

(54) DIGITAL CONCIERGE AND METHOD

(71) Applicant: Michael Boukadakis, Austin, TX (US)

(72) Inventor: Michael Boukadakis, Austin, TX (US)

(*) Notice: Subject to any disclaimer, the term of this patent is extended or adjusted under 35 U.S.C. 154(b) by 0 days.

(21) Appl. No.: 15/174,944

(22) Filed: Jun. 6, 2016

(65) Prior Publication Data

US 2016/0358152 A1  Dec. 8, 2016

Related U.S. Application Data

(63) Continuation-in-part of application No. 13/436,478, filed on Mar. 30, 2012, now Pat. No. 9,361,878.

(51) Int. Cl.
| | |
|---|---|
| *G10L 15/22* | (2006.01) |
| *G06Q 20/22* | (2012.01) |
| *G10L 15/00* | (2013.01) |
| *G06F 17/30* | (2006.01) |

(52) U.S. Cl.
CPC ........ *G10L 15/22* (2013.01); *G06F 17/30283* (2013.01); *G06F 17/30654* (2013.01); *G06Q 20/22* (2013.01); *G10L 15/00* (2013.01)

(58) Field of Classification Search
CPC .................................................... G10L 15/22
See application file for complete search history.

(56) References Cited

U.S. PATENT DOCUMENTS

| | | |
|---|---|---|
| 4,964,156 A | 10/1990 | Blair |
| 5,025,373 A | 6/1991 | Keyser, Jr. et al. |
| 5,050,207 A | 9/1991 | Hitchcock |
| 5,321,840 A | 6/1994 | Ahlin et al. |
| 5,592,538 A | 1/1997 | Kosowsky et al. |
| 5,774,525 A | 6/1998 | Kanevsky et al. |
| 5,822,405 A | 10/1998 | Astarabadi |
| 5,850,429 A | 12/1998 | Joyce et al. |
| 5,946,377 A | 8/1999 | Wolff |
| 6,094,635 A | 7/2000 | Scholz et al. |

(Continued)

FOREIGN PATENT DOCUMENTS

WO        2000067091 A3        5/2002

OTHER PUBLICATIONS

Patnaik, S., E. Brunskill, and W Thies. "Evaluating the accuracy of data collection on mobile phones: A study of forms, SMS, and voice." Information and Communication Technologies and Development (ICTD), 2009 International Conference on. 2009. 74-84. © 2009 IEEE. 12 pages.

*Primary Examiner* — Douglas Godbold
(74) *Attorney, Agent, or Firm* — Cesari & Reed LLP; R. Michael Reed

(57) ABSTRACT

A portable communications device may include a transceiver configured to communicate with a network, a microphone configured to convert sounds into an audio signal, and a processor coupled to the microphone and the transceiver. The device may further include a memory coupled to the processor. The memory may include instructions that, when executed, cause the processor to convert an audio signal into a natural language request and initiate payment of a first account of a first domain-specific data source from funds available in a second account of a second domain-specific data source in response to the natural language request via the network. The instructions may further cause the processor to receive a confirmation of the payment from the network.

19 Claims, 5 Drawing Sheets

(56) References Cited

U.S. PATENT DOCUMENTS

| | | |
|---|---|---|
| 6,104,787 A | 8/2000 | Paris |
| 6,161,090 A | 12/2000 | Kanevsky et al. |
| 6,246,981 B1 | 6/2001 | Papineni et al. |
| 6,314,402 B1 | 11/2001 | Monaco et al. |
| 6,356,868 B1 | 3/2002 | Yuschik et al. |
| 6,385,202 B1 | 5/2002 | Katseff et al. |
| 6,594,484 B1 | 7/2003 | Hitchings, Jr. |
| 6,823,054 B1 | 11/2004 | Suhm et al. |
| 6,851,115 B1 | 2/2005 | Cheyer et al. |
| 7,133,687 B1 | 11/2006 | El-Fishawy et al. |
| 7,194,414 B1 | 3/2007 | Savage et al. |
| 7,219,136 B1 | 5/2007 | Danner et al. |
| 7,356,475 B2 | 4/2008 | Novack et al. |
| 7,403,788 B2 | 7/2008 | Triano et al. |
| 7,493,259 B2 | 2/2009 | Jones et al. |
| 7,593,396 B2 | 9/2009 | Bhandari et al. |
| 7,653,183 B2 | 1/2010 | Patel et al. |
| 7,945,240 B1 * | 5/2011 | Klock ................ G06Q 20/3223 455/406 |
| 7,986,773 B2 | 7/2011 | Kalahasti et al. |
| 8,019,324 B2 | 9/2011 | Roth et al. |
| 8,175,230 B2 | 5/2012 | Bangalore et al. |
| 8,223,931 B1 | 7/2012 | Levian et al. |
| RE44,326 E | 6/2013 | Calderone et al. |
| 8,457,966 B2 | 6/2013 | Sannerud |
| 8,494,854 B2 | 7/2013 | Gross |
| 8,521,536 B1 | 8/2013 | Fox |
| 8,630,859 B2 | 1/2014 | DiFabbrizio et al. |
| 9,959,870 B2 | 5/2018 | Hunt et al. |
| 2001/0056349 A1 | 12/2001 | St John |
| 2002/0035474 A1 | 3/2002 | Alpdemir |
| 2002/0143551 A1 | 10/2002 | Sharma et al. |
| 2002/0169618 A1 * | 11/2002 | Caspari ................ G10L 15/22 704/275 |
| 2004/0044516 A1 | 3/2004 | Kennewick et al. |
| 2005/0267748 A1 | 12/2005 | Wilkes et al. |
| 2006/0029191 A1 | 2/2006 | Miller et al. |
| 2007/0043571 A1 * | 2/2007 | Michelini ............. G10L 15/22 704/270.1 |
| 2007/0150286 A1 | 6/2007 | Miller et al. |
| 2007/0165795 A1 | 7/2007 | Haynor |
| 2007/0263796 A1 | 11/2007 | Patel et al. |
| 2008/0046363 A1 * | 2/2008 | Ali ....................... G06Q 20/102 705/40 |
| 2008/0095327 A1 | 4/2008 | Wlasiuk |
| 2008/0104071 A1 | 5/2008 | Pragada et al. |
| 2008/0154608 A1 | 6/2008 | Evermann et al. |
| 2008/0183706 A1 | 7/2008 | Dong |
| 2008/0249775 A1 * | 10/2008 | Chiu .................... G10L 15/22 704/257 |
| 2008/0255947 A1 | 10/2008 | Friedman |
| 2010/0145861 A1 | 6/2010 | Law et al. |
| 2010/0017248 A1 | 7/2010 | Lynch et al. |
| 2010/0172479 A1 | 7/2010 | Lynch et al. |
| 2010/0172480 A1 | 7/2010 | Lynch et al. |
| 2010/0312547 A1 | 12/2010 | Van Os et al. |
| 2011/0055077 A1 * | 3/2011 | French ................ G06Q 20/04 705/39 |
| 2011/0060683 A1 * | 3/2011 | Salmon Rock ........ G06Q 20/10 705/41 |
| 2011/0123004 A1 | 5/2011 | Chang et al. |
| 2011/0158392 A1 | 6/2011 | DeLuca |
| 2011/0238414 A1 | 9/2011 | Ju et al. |
| 2012/0016678 A1 * | 1/2012 | Gruber ................ G06F 17/3087 704/275 |
| 2012/0022857 A1 | 1/2012 | Baldwin et al. |
| 2013/0080177 A1 | 3/2013 | Chen |
| 2015/0066479 A1 * | 3/2015 | Pasupalak ............ G06F 17/27 704/9 |
| 2016/0042735 A1 * | 2/2016 | Vibbert ................ G10L 15/1822 704/257 |
| 2016/0070696 A1 * | 3/2016 | Lavallee .............. G10L 15/00 704/9 |
| 2016/0125879 A1 * | 5/2016 | Lovitt .................. G10L 17/10 704/275 |
| 2016/0203483 A1 * | 7/2016 | Bridgewater ........ G06Q 20/227 705/75 |

\* cited by examiner

DIGITAL CONCIERGE AND METHOD

CROSS-REFERENCE TO RELATED APPLICATION(S)

This application claims is a continuation-in-part of and claims priority from U.S. patent application Ser. No. 13/436,478 filed on Mar. 30, 2012 and entitled "Computer-Readable Medium, System and Method of Providing Domain-Specific Information", which is incorporated herein by reference in its entirety.

FIELD

The present disclosure is generally related to speech-based systems, and more particularly, to systems configured to perform complex inquiry processing based on speech-based inputs.

BACKGROUND

Conventionally, interactive voice response systems allow users to access financial data (such as credit card information associated with a particular credit card company, bank account data associated with a particular bank, etc.), enterprise phone directories, help desk information, and so on. Such systems are generally configured to assist a user to achieve a pre-defined goal in a particular domain. Such systems are domain specific in that they allow the user to retrieve pre-defined categories of information related to a particular business entity, such as a balance of minutes associated with a cellular phone subscriber account or a credit balance associated with a particular user's credit card account. These type of interactive voice response systems are enterprise specific (domain-specific), meaning that the user must contact the enterprise's system directly, such as by calling a phone number associated with the enterprise to retrieve the information.

In recent years, many corporations implemented secure web site access to allow users to access account information through a secure socket layer connection over the Internet. With respect to a credit card company for example, such connections can be accessed by a user via an Internet browser application to view recent transaction information, available credit, usage data, and so on. Typically, the user may utilize the Internet browser application executing on a computing device, such as a smart phone, a portable computing device (laptop, tablet computer, etc.), or other computing device configured to execute processor-readable instructions.

Recently, Apple Inc. of Cupertino, Calif. has introduced a Siri® software application that operates in conjunction with the Apple iPhone®. Siri® stands for "Speech Interpretation and Recognition Interface" and is a software application that is designed to be an intelligent personal assistant and knowledge navigator. Siri® uses a natural language user interface to answer questions, make recommendations, and perform actions by delegating requests to a set of web services. Other natural language speech-based applications also exist for other types of computing devices, including smart phones that operate using operating systems other than that produced by Apple Computer®.

SUMMARY

In some embodiments, a portable computing device (such as a smart phone) may receive a natural language (NL) spoken command from a user to conduct a financial transaction (such as pay a bill). In response to receiving the command, the computing device may communicate data related to the command to a transaction system, which may access account information associated with the user to initiate the financial transaction according to the command. The computing device may receive a confirmation that the financial transaction has been completed and may communicate the confirmation to one of a display and a speaker of the computing device.

In an embodiment, a computer readable device (such as a hard disc drive, a flash memory device, a compact disc (CD), another non-volatile storage medium, or any combination thereof) embodies instructions that, when executed, may cause the processor to retrieve domain-specific data. The instructions, when executed, cause the processor to perform a method including receiving text corresponding to a natural language request from a device (such as a smart phone) associated with a user, retrieving account data corresponding to the user based on the text, and determining a query based on the text and a domain based on the account data. The instructions further cause the processor to retrieve data from the domain using the query and the account data and to provide at least some of the data to the device.

In another embodiment, a system includes an output interface, a transceiver configured to communicate with a network, a processor coupled to the transceiver and to the output interface, and a memory coupled to the processor. The memory is configured to store instructions that, when executed by the processor, cause the processor to convert an audio input into text, determine a query for a particular domain from a plurality of domains based on the text, and determine authentication information for the particular domain in response to determining the query. The memory is further configured to store instructions that, when executed, cause the processor to transmit the query and the authentication information to the particular domain through the network to retrieve data corresponding to the text from the particular domain and to provide at least a portion of the data to the output interface.

In still another embodiment, a method includes receiving text corresponding to a natural language request from a device associated with a user and retrieving account data corresponding to the user based on the text. The method further includes determining a domain from a plurality of domains based on the account data and a query from a plurality of queries based on the text, retrieving data from the domain using the query and the account data, and providing at least some of the data to the device.

In another embodiment, a method may include receiving a natural language request corresponding to an audio input from a user at a portable communications device and automatically retrieving account data from a first account of a first domain-specific data source of a plurality of domain-specific data source in response to the natural language request using the portable communications device. In some embodiments, the first account may have no association with the portable communications device. The method may further include automatically initiating a payment to the first account from a second account in response to the natural language request.

In still other embodiments, a computer readable storage device may embody instructions that, when executed, cause a processor to perform a method including receiving a natural language request corresponding to an audio input associated with a subscriber. The instructions may further cause the processor to perform a method further including determining first and second account information corresponding to the subscriber, automatically initiating a payment from the second account to the first account based on the natural language request, and providing output information related to the payment information to an output interface.

In yet other embodiments, a portable communications device may include a transceiver configured to communicate with a network, a microphone configured to convert sounds into an audio signal, and a processor coupled to the microphone and the transceiver. The device may further include a memory coupled to the processor. The memory may include instructions that, when executed, cause the processor to convert an audio signal into a natural language request and initiate payment of a first account of a first domain-specific data source from funds available in a second account of a second domain-specific data source in response to the natural language request via the network. The instructions may further cause the processor to receive a confirmation of the payment from the network.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
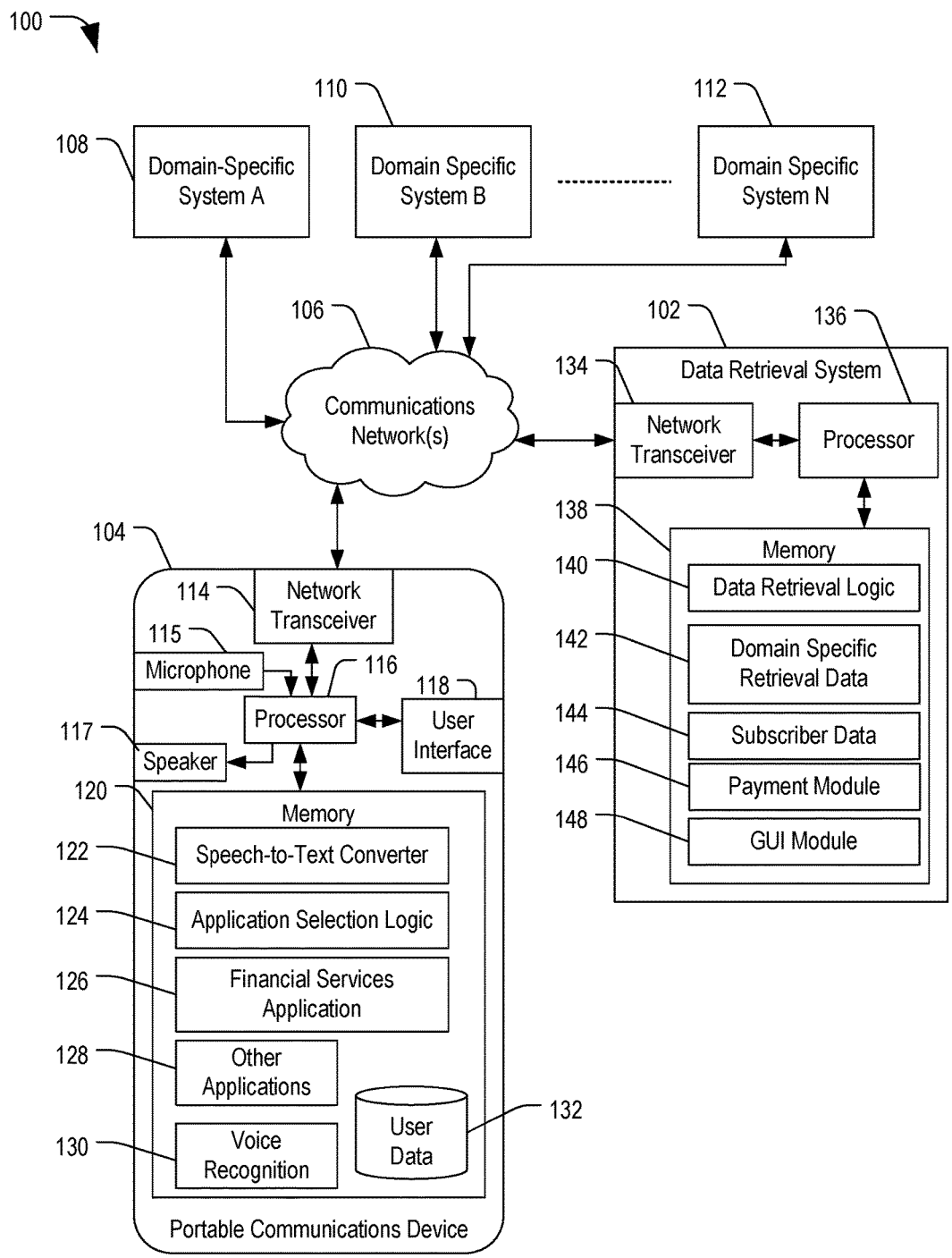
FIG. 1 is a block diagram of an embodiment of a system configured to provide domain-specific information.

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor of a computing device, such as a tablet computer, a laptop computer, a smart phone, a personal computer, a server, another computing device, or any combination thereof. Dedicated hardware implementations including, but not limited to, application specific integrated circuits, programmable logic arrays, and other hardware devices can likewise be constructed to implement the methods and functions described herein. Further, the methods described herein may be implemented as a device, such as a computer readable storage device or memory device, including instructions that, when executed, may cause a processor to perform the methods described below.

Embodiments of systems, computing devices, and methods are described below that are configured to allow a user to interact with multiple domain-specific systems (i.e. systems associated with a particular enterprise, such as a particular credit card or bank system) to retrieve account information without having to dial in to an interactive voice response server and without having to visit the enterprise's website. In an example, the computing device is configured to receive a voice request and to retrieve account information from one or more domain-specific accounts in response to the voice request. Further, the computing device may be configured to process a financial transaction on behalf of the user in response to receiving the voice request and utilizing at least a portion of the account information.

In one example, a server is provided that is configured to store information related to the user's accounts, such as credit card accounts, bank accounts, and the like, as well as accounts associated with utilities, vendors, and other accounts. The server may provide an interface for receiving natural language commands from the speech-to-text converter application or from a smart phone to provide a one-stop location for the user to retrieve account information from various accounts associated with different companies and optionally to initiate a transaction, such paying a bill. For example, the server is configured to receive a request from a portable device associated with the user, to determine account information associated with the user based on a received request, to retrieve data associated with the user's account, optionally to process the data, and then to transmit the data to the user's device. Such processed data may include automatically logging into an account associated with the user and initiating a payment transaction, for example.

In a particular example, the user can turn on his smart phone and ask the phone for his last five credit card transactions for a specific credit card. The smart phone converts the speech into text and accesses an application that is configured to send a request related to the text to the server. In response to the request, the server determines the user's account information and communicates with a domain-specific system associated with the specific credit card to retrieve the transaction data. In some instances, the server can process the transaction data to extract the specific information based on the request and can return the specific information to the user's smart phone. In other instances, the server may return the transaction data to the smart phone (or to a network-based system that an application running on the smart phone may interact with) and the smart phone (or the network based system) can process the transaction data to extract the specific information and then present the information. In an example, the smart phone can then provide the specific information to the user, either through the display or audibly by converting the specific information to an audio signal (text-to-speech) for reproduction through a speaker of the smart phone.

In some instances, the smart phone may store user account data including instructions executable by a processor of the smart phone to access domain-specific account information in a local memory and to communicate with a domain-specific server to retrieve account information, such as (for example) a last five credit card transactions for a particular credit card. The smart phone may then present the account information to the user through a display or through a speaker.

In a particular example, a user may interact with a speech-to-text application on the smart phone to pay a bill associated with the user. For example, the user may say "Pay my water bill". In response, the speech-to-text converter application may convert the spoken command into text and may communicate data related to the command to a network system. The network system may utilize an interface to receive and interpret the command. The system may authenticate the command (such as via voice print or username/password information) and may retrieve account information corresponding to the request. If the account information cannot be found, the system may communicate a request for more information to the computing device. For example, the system may send a message that causes an application executing on the smart phone to request data from the user. For example, the smart phone may inform the user, "There is no account information on record for your water utility. Do you have the account number?" The system may then prompt the user through a series of questions in order to set up the account within the system. Once the account information is gathered, the system may complete the transaction and may store the information for subsequent use. Other embodiments are also possible. One example of a system to provide domain-specific information is described below with respect to FIG. 1.

FIG. 1 is a block diagram of an embodiment of a system 100 configured to provide domain-specific information. System 100 includes a data retrieval system 102 coupled to a portable communications device 104 and to one or more domain-specific systems 108, 110, and 112 through a communications network 106. Portable communications device 104 can be a laptop or tablet computer, a smart phone, a personal digital assistant, or some other computing device.

Portable communications device 104 includes a network transceiver 114 configured to communicate with communications network 106. Portable communications device 104 further includes a processor 116 coupled to network transceiver 114, to a user interface 118 (such as a keypad, display, or touch screen interface), and to a memory 120. Additionally, portable communications device 104 includes a microphone 115 coupled to processor 116 to provide a signal related to an audio input. In an example, the microphone 115 includes an analog-to-digital converter. In another example, portable communications device 104 includes an analog-to-digital converter between microphone 115 and processor 116. Additionally, portable communications device 104 includes a speaker 117 coupled to processor 116 and configured to produce an audible output.

Memory 120 stores speech-to-text converter instructions 122 that, when executed, cause processor 116 to convert audio data from microphone 115 into a natural language text input. Memory 120 also stores application selection logic 124 that, when executed, causes processor 116 to select an application based on the natural language text input. In one example, speech-to-text converter instructions 122 and application selection logic 124 may be implemented by a single application. In a particular example, portable communications device 104 can be an iPhone® executing Siri® by Apple Inc. of Cupertino, Calif. In this particular instance, Siri® would operate to convert the spoken request, to select the financial services application 126 in response to the spoken request, and to present the account data results to the user. It should be appreciated that Siri® represents one of many possible speech-to-text applications. Other similar applications may include, but are not limited to, Google® Now, Skyvi, Robin, Indigo Virtual Assistant, and Cortana®.

Memory 120 further includes a financial services application 126 and other applications 128. Memory 120 also includes voice recognition software 130 that can be executed by the processor 116 to authenticate the voice pattern of a particular user. Financial services application 126, when selected by application selection logic 124 and executed, may cause processor 116 to access user data 132 (for example, to retrieve account login information, such as account number and password data associated with a subscriber account of data retrieval system 102) and to communicate a request including at least a portion of the user data 132 to data retrieval system 102.

In some embodiments, the financial services application 126 may be omitted and the application selection logic 124 may cause the processor 116 to communicate the data to a cloud-based service (i.e., a server system accessible through the network 106). In a particular example, the sounds of a user's speech may be immediately encoded into a compact digital form that preserves its information by the portable communications device 104. The signal from the portable communications device 104 may be relayed wirelessly through the communications network 106 to a server in the network cloud, which may include a plurality of speech recognition models.

At the same time, the speech-to-text converter 122 may evaluate the content of the audio signal, locally. The speech-to-text converter 122 may communicate with the server in the cloud to gauge whether the command can be best handled locally or if it must connect to the network 104 for further assistance. In certain embodiments, the server may compare the audio signal against a statistical model to estimate the corresponding text based on the sounds. Similarly, the local speech-to-text converter 122 may cause the processor 116 to compare the audio signal an abridged version of that statistical model. Each model produces an estimate and determines a corresponding reliability. Based on the reliability, the system may apply a language model, which can estimates the text. Given a sufficient level of confidence, the speech-to-text converter 122 may cause the processor 116 to create a candidate list of interpretations for text. If the confidence level is high enough, the speech-to-text converter 122 (or the network server) may interact with the data retrieval system 102 to perform the command included in the audio signal. If the interpretation of the audio signal is too ambiguous at any point during the process or if the account information indicated in the command is not present in the data retrieval system 102, the processor 116 may defer to the user by providing one or more text or audio prompts to acquire further information.

Data retrieval system 102 includes a network transceiver 134 configured to couple to communications network 106. Data retrieval system 102 further includes a processor 136 coupled to network transceiver 134 and to a memory 138. Memory 138 includes data retrieval logic 140 that, when executed, causes processor 136 to receive the request, to retrieve subscriber data 144 associated with the user in response to receiving the request, and to retrieve domain-specific retrieval data 142 based on the request. Subscriber data 144 may include account login information for a plurality of account holders as well as subscriber login data for the particular user to login to data retrieval system 102. In a particular example, subscribers may login and register one or more accounts with data retrieval system 102, configuring his/her subscriber account and populating subscriber specific account information stored in subscriber data 144. Such account data can include account numbers, domain-specific information, login information (such as password or pin data), and other information for accessing the particular domain-specific system 108, 110, or 112.

Domain-specific retrieval data 142 may include an address for accessing a particular domain-specific system 108 (such as a uniform resource locator (URL), an Internet Protocol (IP) address, or some other address). Domain specific retrieval data 142 may also include data needed to authenticate a user to the domain-specific system 108 and/or to navigate particular selection options in order to retrieve the account data associated with the request. Further, the domain specific retrieval data 142 may include information to enable login and payment of an account associated with a particular domain. Subscriber data 144 includes account information associated with multiple subscribers. For a particular subscriber, subscriber data 144 can include account information for each account registered by a particular subscriber, the account number, the financial institution that holds the account, and authentication information (e.g., username, password, pin, or other authentication information).

Data retrieval logic 140, when executed, further causes processor 136 to retrieve account data from one of domain-specific systems 108, 110, and 112 using the subscriber data 144 and the domain-specific retrieval data 142. Data retrieval logic 140 may cause processor 136 to access the records of one of the domain-specific systems 108, 110 or 112 associated with the user to gather account data. In an example, data retrieval logic 140 may cause processor 136 to scrape account data from a web page of a particular domain-specific system. Further, data retrieval logic 140, when executed by processor 136, can optionally cause processor 136 to extract specific information from the retrieved data according to the request and to transmit the specific information to portable communications device 104 through network 106. Otherwise, data retrieval logic 140 causes processor 136 to provide the retrieved account data to portable communications device 104.

In some embodiments, the data retrieval system 102 may include a payment module 146 that, when executed, may cause the processor 136 to initiate a payment from one of the subscriber's accounts to another of the subscriber's accounts. In an example, in response to receiving a command from the portable communications device 104 the data retrieval system 102 may retrieve data associated with a first account to determine login information and to determine an amount due. The data retrieval system 102 may determine account information associated with a second account, such as a credit card account or a bank account. The data retrieval system 102 may automatically initiate payment of the amount due (or another amount) to the first account from or using the second account based on the command. Once the transaction is initiated, the data retrieval system 102 may communicate a confirmation to the portable communications device 104, which confirmation may be communicated to a user as an audio output, as a text message, an image or both provided to the user interface, or any combination thereof.

In some embodiments, the memory 138 may include a graphical user interface (GUI) module 148 that, when executed, may cause the processor 136 to provide an interface through which a user may configure one or more accounts. In some embodiments, the GUI module 148 may present a web-based interface that can be accessed by a computing device through the communications network 106. The user may utilize an Internet browser application to interact with the GUI to set up a user account and to configure one or more payment accounts, such as credit card accounts, bank accounts, utility accounts, other accounts, or any combination thereof.

In general, system 100 enables the user to access his/her financial account information using portable communications device 104, which can communicate with data retrieval system 102 to acquire the data and which can communicate the data to the user in a suitable format (i.e., audible output or visual display). In a particular example, the user speaks a request for account information associated with one of the domain-specific systems 108, 110, and 112. One example of a request could be "What were my last five deposits in my checking account?" Another example could be "Tell me my four visa transactions."

In another example, the system 100 enables the user to access his or her financial account information in order to imitate a payment to another account. The user may speak a request such as "pay my water bill." In response to the request, the system 100 may retrieve the user's water utility account information, determine the balance due, and initiate a payment from a second account (credit card, bank account, or another account, such as a PayPal® account) to pay the balance due (or to pay another amount included in the request. For example, the user may instruct the system 100 to pay the "minimum due for my visa card using my bank account." In this instance, the system 100 may determine the minimum due on the user's visa account and may initiate a payment from the user's bank account to pay the determined amount. Other embodiments are also possible.

In response to the spoken request, portable communications device 104 uses speech-to-text converter 122 to convert the spoken request to text and accesses application selection logic 124 to determine which application to use based on the text. If the spoken request involves accessing an account of a domain-specific system (such as a credit card, bank, or some other enterprise), application selection logic 124 accesses financial services application 126, which accesses user data 132 to retrieve login information associated with data retrieval system 102 and possibly data identifying the type of account or related information. Processor 116 uses financial services application 126 to generate a request, which includes the login information for data retrieval system 102 from user data 132 and which includes data related to the text derived from the spoken request, and to send the request to data retrieval system 102.

Data retrieval system 102 receives the request from portable communications device 104. In response to the request, data retrieval system 102 authenticates the login information from the request and accesses the subscriber data 144 based on the login information. Further, data retrieval system 102 uses data retrieval logic 140 to determine domain specific retrieval data 142 and account data from subscriber data 144 in order to access the particular domain-specific system 108, 110, or 112 based on the request. In an example, data retrieval system 102 may uses data from subscriber data 144 and from domain specific retrieval logic 142 to access domain-specific system 108 to retrieve account data associated with the subscriber, to scrape the account data, to generate an output including at least a portion of the account data, and optionally to send the output to portable communications device 104 based on the request.

In some embodiments, the data retrieval system 102 may receive an instruction to pay a balance due for an account. In response to the instruction, the data retrieval system 102 may determine the account information and may use the account information to determine a balance due for a particular account. The data retrieval system 102 may then determine a payment account from which funds are to be transferred in order to complete a payment transaction, and may initiate payment from the payment account to the account for which payment is to be made. The data retrieval system 102 may then communicate an output including at least a portion of the account data to the portable communications device 104. In an example, the output may include account identifying information as well as a confirmation that the transaction has been completed.

Portable communications device 104 receives the output from data retrieval system 102. In response to receiving the output, portable communications device 104 may present the output as text to a display portion of user interface 118. Alternatively, processor 116 may execute instructions (not shown) to convert the output into an audible output for reproduction by speaker 117. Thus, the user can speak to the portable communications device and, in response to the spoken request, receive account specific information from one or more domain-specific systems.

It should be understood that the domain-specific systems 108, 110, and 112 may be accessed differently from one another, both in terms of the login process and in terms of how to retrieve the data after a successful login. Accordingly, domain specific retrieval data 142 includes data related to the retrieval process for each specific account.

While the above-example uses a data retrieval system 102 to access particular domain-specific systems 108, 110, and 112, in an alternative embodiment, portable communications device 104 can be configured to communicate directly with domain-specific systems 108, 110, and/or 112. One possible implementation of such a system is described below with respect to FIG. 2.

Figure 2:
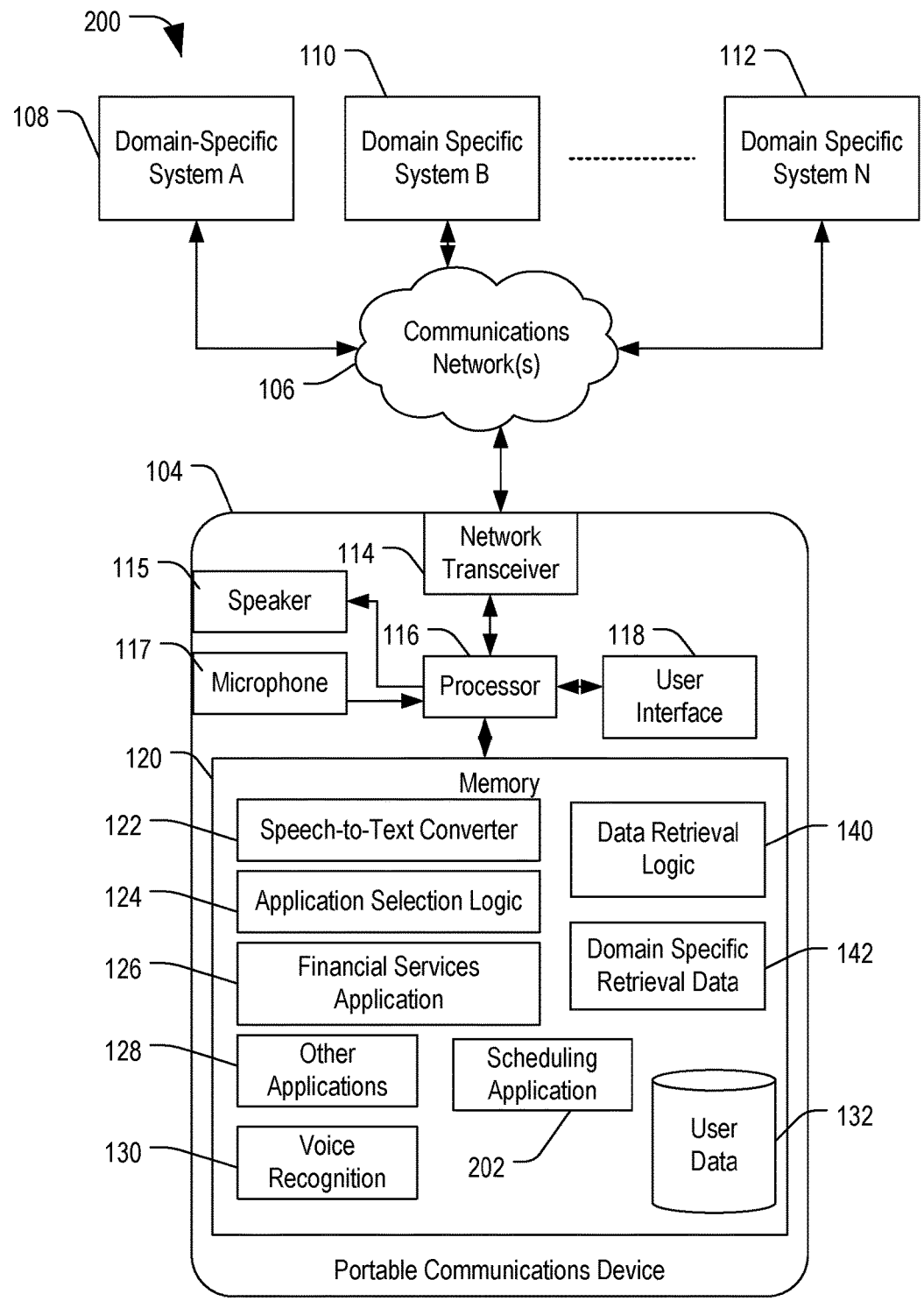
FIG. 2 is a block diagram of a second embodiment of a system configured to provide domain-specific information.

FIG. 2 is a block diagram of a second embodiment of a system 200 configured to provide domain-specific information. In this example, system 200 includes all of the elements of system 100 in FIG. 1, except that data retrieval system 102 is omitted, and data retrieval logic 140 and domain-specific retrieval data 142 are moved from the memory of data retrieval system 102 to the memory 120 of portable communication device 104. Further, the memory 120 may include a scheduling application 202 that, when executed, may cause the processor 116 to schedule one or more tasks or operations. In an example, the scheduling application 202 may cause the processor 116 to receive schedule information related to due dates and to automatically remind the user when a due date is approaching. In some embodiments, the scheduling application 202 may cause the processor 116 to automatically initiate a payment when the user authorizes such automatic payments. Alternatively, in some embodiments, the scheduling application 202 may cause the processor 116 to determine an amount due and to prompt the user (by text, for example) to remind the user that such payments are due. Other embodiments are also possible.

In this instance, data retrieval logic 140 and domain-specific retrieval data 142 are utilized by processor 116 to access a selected one of the domain-specific systems 108, 110, and 112 based on the output of the speech-to-text converter application 122. In particular, the user can provide a spoken request to portable communications device 104, which is converted into text and which is used by financial services application 126, in conjunction with domain specific retrieval data 142 and data retrieval logic 140 to retrieve domain-specific information corresponding to a user account from one of the domain-specific systems 108, 110, and 112.

In this instance, user data 132, instead of including subscriber login data, may include account information, pin numbers, credentials, passwords, and other data that may be used to login to the domain-specific systems 108, 110, and 112. In this instance, financial services application 126 and data retrieval logic 140 are used to identify the appropriate account information to access the particular domain-specific system. In this instance, processor 116 of portable communications device 104 executes data retrieval logic 140, retrieves the data, processes, and presents the data to the user.

In certain embodiments, the financial services application 126 may cause the processor 116 to receive a command to pay a bill, determine user account data corresponding to a payment account and related to an account associated with the bill. If either account cannot be determined, the financial services application 126 may cause the processor 116 to prompt the user to supply the missing information. Once the information is determined, either from user data 132 or by prompting the user, the financial services application 126 may cause the processor 116 to retrieve information from a first account, to determine an amount due, and to automatically initiate a payment transaction from a second account to the first account in response to receiving the command. The financial services application 126 may then communicate an indicator (an audio alert to the speaker; a text message, an image, or both to the user interface; or any combination thereof) to the user.

Regardless of how portable communications device 104 receives the account information, portable communications device 104 may further process the account information to extract data corresponding to the spoken request. If the user asks for the three most recent credit card transactions, portable communications device 104 can process the account information to provide an output having the three transactions. If the user asks the device to pay the minimum due for a first account, the portable communications device 104 can process the account information to determine the minimum payment due and then may automatically initiate a payment transaction from a second account to the first account to pay the determined amount based on the user instruction. Other embodiments are also possible.

While the above-examples described systems for providing domain-specific information to the user, other systems may also be used. Further, though the speech-to-text converter application 122 is depicted as software stored in memory, the converter may alternatively be implemented as hardware and/or as a field programmable gate array (depending on the implementation). Further, one possible implementation out of many possible implementations of a method of providing domain-specific information is described below with respect to FIG. 3.

Figure 3:
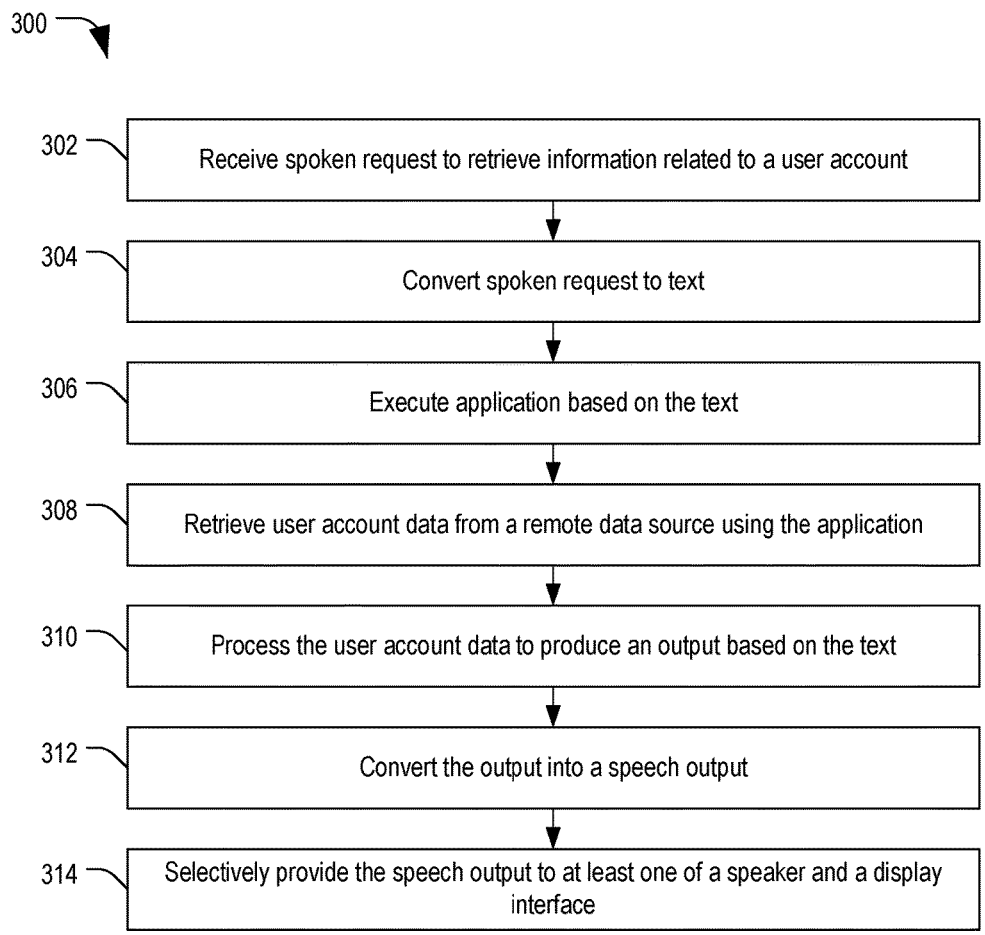
FIG. 3 is a flow diagram of an embodiment of a method of providing domain-specific information using a portable computing device, such as a smart phone.

FIG. 3 is a flow diagram of an embodiment of a method 300 of providing domain-specific information using a portable computing device, such as a smart phone. At 302, a spoken request is received to retrieve information related to a user account. For example, the user may speak the following query: "What are my last five Citibank® transactions." Portable communications device 104 may treat this question as a request. Advancing to 304, portable communications device 104 converts the spoken request into text. Continuing to 306, portable communications device 104 executes an application based on the text. For example, the application may be a financial services application.

Moving to 308, portable communications device 104 retrieves user account data from a remote data source using the application. Proceeding to 310, portable communications device 104 processes the user account data to produce an output based on the test. In this example, the user specified the last five Citibank® transactions, so portable communications device 104 processes the user account data to extract the last five Citibank® transactions to produce the output. Continuing to 312, portable communications device 104 converts the output into a speech output. Advancing to 314, portable communications device 104 provides the speech output to a speaker for reproduction as an audible output signal. In an alternative example, portable communications device 104 can provide the output to a display as text, graphics or both.

Method 300 represents one possible example a process for providing domain-specific information to the user; however, other methods are also possible. For example, blocks 212 and 214 may be omitted and the output may be provided to a display, such a user interface 118, instead. Further, while in the above-example, the information is retrieved and provide by portable communications device 104, it should be appreciated that at least some of the processes may be performed by a server in communication with portable communications device 104. An example of a method of providing domain-specific information to the user from the perspective of a server (such as data retrieval system 102 in FIG. 1) in communication with the portable communications device 104 is described below with respect to FIG. 4.

Figure 4:
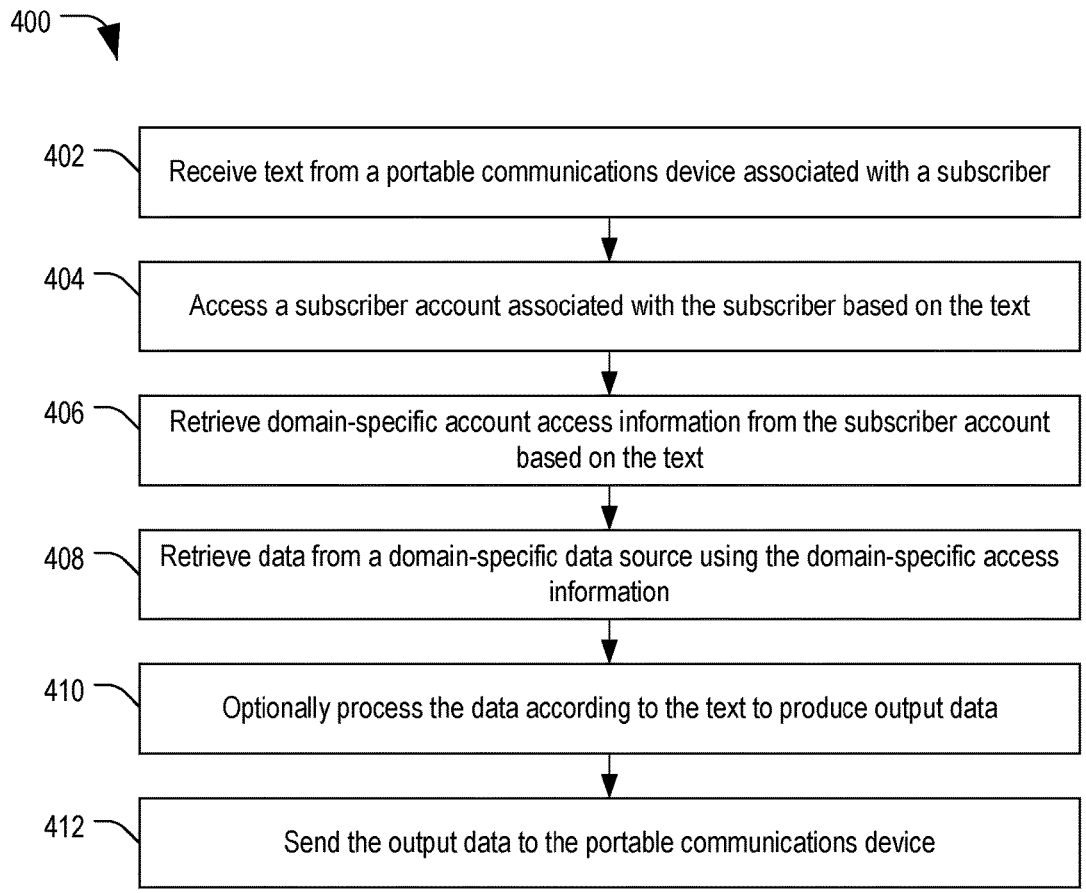
FIG. 4 is a flow diagram of a second embodiment of a method of providing domain-specific information using a server configured to communicate with a portable computing device, such as a smart phone.

FIG. 4 is a flow diagram of a second embodiment of a method 400 of providing domain-specific information using a server 102 configured to communicate with a portable computing device, such as a smart phone. At 402, the server 102 receives a request from a portable computing device (such as portable communications device 104 in FIGS. 1 and 2). Advancing to 404, the server 102 accesses a subscriber account associated with the subscriber based on the request. The subscriber account data is stored in a memory of server 102.

Continuing to 406, the server 102 retrieves domain-specific account information from the subscriber account based on the text. The domain-specific account information includes login information that can be used to access the user's account within the domain-specific system. Moving to 408, the server 102 retrieves data from a domain-specific data source using the domain-specific access information. In an example, the domain-specific access information includes login and/or access information that allows server 102 to interact with and access the user's account data associated with the domain-specific access information.

Advancing to 410, server 102 optionally processes the retrieved data according to the text to produce output data. The output data can include an extracted portion of the retrieved data. Proceeding to 412, server 102 sends the output data to the portable computing device 104.

In the example of FIG. 4, the server receives text from the portable communications device; however, in some instances the portable communications device 104 communicates the audio data to server 102, which may be configured to convert the audio data into text and then to proceed with block 404 of method 400. While method 400 is one possible example, various steps of method 400 may be altered or omitted. In a particular example, the text may include the subscriber account information and block 406 may be omitted. Additionally, in some instances, block 410 may be omitted.

Figure 5:
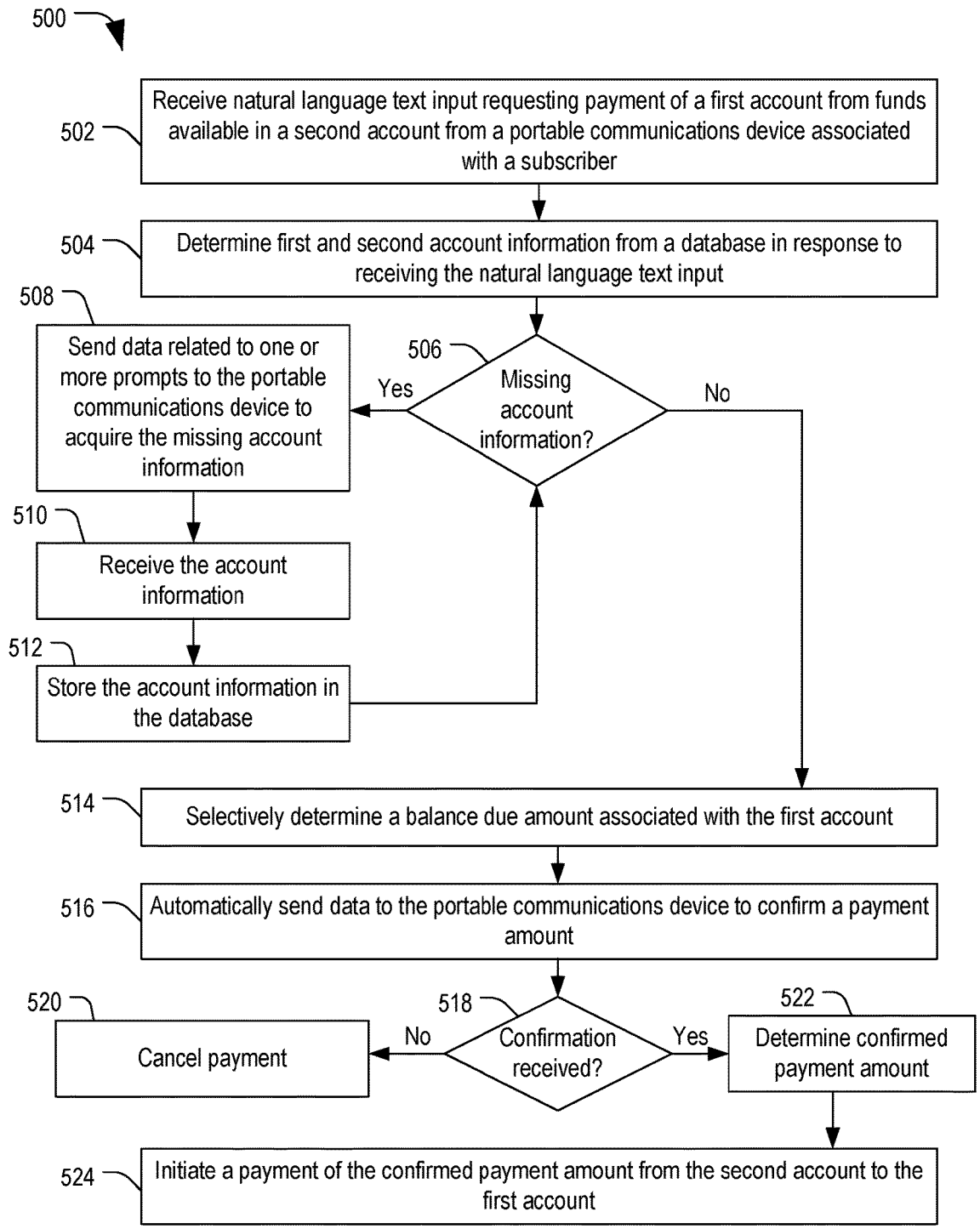
FIG. 5 depicts a flow diagram of a method of initiating a payment transaction in response to a spoken command, in accordance with certain embodiments of the present disclosure.

FIG. 5 depicts a flow diagram of a method 500 of initiating a payment transaction in response to a spoken command, in accordance with certain embodiments of the present disclosure. At 502, the method 500 may include receiving a natural language (NL) text input requesting payment of a first account from funds available in a second account from a portable communications device associated with a subscriber. In some embodiments, the NL text input may be received at a network system. In other embodiments, the NL text input may be received by a financial services application executing on a processor of the portable communications device.

At 504, the method 500 may include determining first and second account information from a database in response to receiving the NL text input. The first account may be associated with an account to be paid, and the second account may be associated with an account from which payment is to be made.

At 506, the method 500 may include determining if account information is missing. For example, if the user has not yet configured the particular account in the system, the account information may be missing from the database. At 506, if account information is missing, the method 500 may include sending data related to one or more prompts to the portable communications device to acquire the missing account information, at 508. In some embodiments, the prompts may include specific questions or data to be presented as an audio output or to a display interface.

At 510, the method 500 can include receiving the account information. In some embodiments, the account information may be received from the portable communications device in response to the one or more prompts. At 512, the method 500 may include storing the account information in the database. The method 500 may return to 506 to determine if there is still missing account information.

At 506, if the account information is determined, the method 500 may include selectively determining a balance due amount associated with the first account, 514. In an example, the system may determine information associated with the first account and may use the determined information to retrieve account data to access the account to determine the balance due amount.

At 516, the method 500 may include automatically sending data to the portable communications device to confirm a payment amount. The system may communicate the minimum due amount and the balance due amount to confirm how much the user wishes to pay. At 518, the method 500 may include determining if confirmation is received. If confirmation is not received, the method 500 may include canceling the payment, at 520.

Otherwise, at 518, if confirmation is received, the method 500 may include determining a confirmed payment amount, at 522. The confirmed payment amount may be determined by processing a natural language input. At 524, the method 500 can include initiating a payment of the confirmed payment amount from the second account to the first account.

In some embodiments, the method may also include communicating a confirmation to the user of the portable communications device. In some embodiments, if the processor of the portable communications device is performing the method 500, the confirmation may be communicated via an audio output to the speaker or via visual data provided to a user interface, such as a display.

In conjunction with the systems and methods of FIGS. 1-5, a system is disclosed that includes a portable communications device, such as a smart phone, that is configured to determine account information associated with at least one domain-specific data source (such as a server of a credit card company, a bank, or another enterprise). The portable communications device is configured to receive a user request corresponding to a natural language request (an audio input or a natural language text input) and to communicate with one or more domain-specific data sources to retrieve data corresponding to the user query and to automatically initiate a payment transaction in response to the natural language request. In some embodiments, the portable communications device can further process the data to provide an output corresponding to the user request.

In some embodiments, the system may be configured to receive a spoken command to perform a financial transaction. In response to the spoken command, the system may determine account information and may initiate payment from a first account to a second account based on the spoken command. It should be appreciated that the system described above may be used to initiate a payment of a credit card, a mortgage, a utility, another account or any combination thereof. Further, the system makes it possible for a user to issue a spoken command to his or her portable communications device in order to initiate a transaction, such as payment of a bill. Other embodiments are also possible.

In some embodiments, the methods, functions, and devices described herein provide improvements to the operation of a portable computing device. By enabling voice-initiated payment instructions, the operation of the portable computing device is extended to enable use in situations that may otherwise prohibit handling of a computing device, such as in school zones or in municipal areas that prohibit handling smart phones while driving. Thus, a user may be enabled to process personal or business financial transactions while in transit to and from work. Further, the user may be able to initiate such transactions when he or she remembers, rather than having to wait until he or she gets home. By enabling such transactions through speech commands, the user can simply access the voice-enabled application on his or her computing device and initiate the payment operation.

Although the present invention has been described with reference to preferred embodiments, workers skilled in the art will recognize that changes may be made in form and detail without departing from the scope of the invention.

What is claimed is:

1. A computer readable storage device embodying instructions that, when executed, cause a processor to perform a method comprising:
   receiving a natural language request corresponding to an audio input associated with a subscriber at the processor of a portable communications device;
   determining first and second account information corresponding to the subscriber using the processor of the portable communications device to access user data stored in the computer readable storage device of the portable communications device;
   automatically initiating a payment from the second account to the first account based on the natural language request by communicating with at least one of a server associated with the second account and a server associated with the first account through a communications network by:
      automatically accessing the first account based on the natural language request using the first account information by sending data related to the first account information to a server associated with a first domain-specific data source;
      automatically extracting data from the first domain-specific data source based on the first account information to determine an amount due;
      communicating data related to the amount due to an interface of the portable communications device to determine a payment amount;
      receiving an input indicating the payment amount from the interface; and
      automatically initiating the payment corresponding to the payment amount by communicating with the server associated with the first domain-specific data source; and
   providing output information related to the payment information to an output interface of the portable communications device.

2. The computer readable storage device of claim 1, wherein the instructions further cause the processor to perform the method further comprising:
   converting the output information to audio data using the processor of the portable communications device; and
   wherein the output interface comprises one of a speaker and an audio output terminal configurable to reproduce the audio data as an audible output.

3. The computer readable storage device of claim 1, further comprising instructions that, when executed, cause the processor to perform the method further comprising:
   receiving a natural language audio input via a microphone of the portable communications device; and
   converting the natural language audio input into the natural language request using the processor of the portable communications device to convert speech to text.

4. The computer readable storage device of claim 1, wherein the instructions that cause the processor to determine the first and second account information further comprises instructions that, when executed, cause the processor to perform the method further comprising:
   determining the first and second account information by searching a database within the computer readable storage device; and
   when at least one of the first and second account information is not present in the database, providing one or more prompts to an interface of the portable communications device to determine the at least one of the first and second account information.

5. The computer readable storage device of claim 1, wherein the instructions that cause the processor to automatically initiate the payment include instructions that, when executed, cause the processor to:
   transmit the natural language request and user-specific authentication data from the portable communications device to a server through a communications network to initiate the payment; and
   receive a confirmation at the portable communications device from the server via the communications network.

6. The computer readable storage device of claim 1, further including instructions that, when executed, cause the processor to:
   extract data from the account information to determine an amount due;
   communicate data to a user interface of the portable communications device to determine a payment amount;
   receive a confirmed payment amount from the user interface; and
   initiate payment of the confirmed payment amount as the payment by communicating with the second account to initiate payment to the first account.

7. A portable communications device comprising:
a transceiver configured to communicate with a network;
a microphone configured to convert sounds into an audio signal;
a processor coupled to the microphone and the transceiver; and
a memory coupled to the processor, the memory comprising instructions that, when executed, cause the processor to:
  convert an audio signal into a natural language request using the processor;
  determine first and second account information corresponding to an account holder by accessing user data stored in the memory;
  initiate payment of a first account of a first domain-specific data source from funds available in a second account of a second domain-specific data source in response to the natural language request by communicating the first account information and a payment amount to the second domain-specific data source through the network, wherein the payment is initiated by the processor configured to:
    access a first account based on the natural language request using the first account information by sending data related to the first account information to a server associated with the first domain-specific data source;
    extract data from the first domain-specific data source based on the first account information to determine an amount due;
    communicate data to an interface of the portable communications device to determine a payment amount;
    receive data indicating the payment amount from the interface; and
    initiate payment of the payment amount as the payment by communicating with the server associated with the first domain-specific data source; and
  receive a confirmation of the payment from the second domain-specific data source through the network.

8. The portable communications device of claim 7, wherein the memory further includes instructions that, when executed, cause the processor to generate an output related to the confirmation and to provide the output to an output interface coupled to the processor.

9. The portable communications device of claim 8, wherein the output interface comprises at least one of a speaker and a user interface having a display.

10. The portable communications device of claim 9, wherein the portable communications device comprises at least one of a smart phone, a tablet computer, a laptop computer, and a personal digital assistant.

11. The portable communications device of claim 7, wherein the memory further includes instructions that, when executed, cause the processor to retrieve account data associated with the first account associated with a subscriber through the network based on the natural language input.

12. The portable communications device of claim 7, wherein the memory further includes instructions that, when executed, cause the processor to:
  determine the first account information and the second account information associated with a subscriber by searching a database within the memory; and
  when at least one of the first and second account information is not present in the database, provide one or more prompts to an input interface of the portable communications device to determine the at least one of the first and second account information based on input data received from a user via the input interface.

13. The portable communications device of claim 7, wherein the instructions that cause the processor to initiate the payment include instructions that, when executed, cause the processor to:
  transmit the natural language request and user-specific authentication data to a server to initiate the payment; and
  receive a confirmation from the server.

14. A method comprising:
receiving, at a microphone of a portable communications device, a natural language request corresponding to an audio input from a user;
automatically convert the audio input into text using a processor of the portable communications device;
automatically retrieving account data associated with a first account from a memory of the portable communications device based on the text;
automatically, using the portable communications device, accessing a first domain-specific data source of a plurality of domain-specific data sources in response to the natural language request using the account data, the first account having no association with the portable communications device; and
automatically initiating a payment to the first account from a second account in response to the natural language request by communicating the payment information from the portable communications device to the first domain-specific data source;
wherein automatically initiating the payment includes:
  automatically accessing the first account based on the natural language request using the first account information by sending data related to the first account information to a server associated with the first domain-specific data source;
  extract data from the first domain-specific data source based on the first account information to determine an amount due;
  communicate data to an interface of the portable communications device to determine a payment amount;
  receive data indicating the payment amount from the interface; and
  initiate payment of the payment amount as the payment by communicating with the server associated with the first domain-specific data source.

15. The method of claim 14, further comprising:
receiving an audio input at the processor of the portable computing device; and
automatically determining the natural language request based on the audio input using a text-to-speech converter using the processor.

16. The method of claim 14, wherein retrieving the account data comprises:
  automatically determining account login information associated with the first account based on the natural language request by searching the memory of the portable communications device;
  automatically accessing the first account at the first domain-specific data source using the processor of the portable communications device to determine an amount due; and
  communicating the amount due to an output interface of the portable communications device in response to the natural language request.

17. The method of claim 16, further comprising:
communicating a prompt to the output interface to determine a payment amount;
receiving at least one of an audio input and a text input indicating a confirmed payment amount from one of a microphone and an input interface; and
automatically initiating payment of the confirmed payment amount as the payment in response to receiving the at least one of the audio input and the text input.

18. The method of claim 14, further comprising:
transmitting data related to the natural language request and user-specific authentication data to a server to initiate the payment; and
receive a confirmation from the server.

19. The method of claim 14, further comprising:
receiving a payment confirmation from a server in response to initiating the payment; and
communicating an indicator related to the payment confirmation to one of an audio output interface and a display interface of the portable communications device.

* * * * *